United States Patent
Yun et al.

(10) Patent No.: US 8,487,588 B2
(45) Date of Patent: Jul. 16, 2013

(54) BATTERY PACK

(75) Inventors: Hanseok Yun, Yongin-si (KR); Susumu Segawa, Yongin-si (KR); Tetsuya Okada, Yongin-si (KR); Euijeong Hwang, Yongin-si (KR); Sesub Sim, Yongin-si (KR); Beomgyu Kim, Yongin-si (KR); Jinwan Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 421 days.

(21) Appl. No.: 12/954,608

(22) Filed: Nov. 24, 2010

(65) Prior Publication Data

US 2011/0121784 A1 May 26, 2011

(30) Foreign Application Priority Data

Nov. 24, 2009 (KR) .................... 10-2009-0113952

(51) Int. Cl.
*H02J 7/00* (2006.01)
*G05F 1/67* (2006.01)

(52) U.S. Cl.
USPC ........... 320/153; 320/118; 320/112; 320/104; 320/150; 323/907

(58) Field of Classification Search
USPC .......................................................... 320/153
See application file for complete search history.

(56) References Cited

U.S. PATENT DOCUMENTS

| | | | |
|---|---|---|---|
| 6,088,662 A * | 7/2000 | Flinsbaugh et al. | 702/132 |
| 6,225,780 B1 * | 5/2001 | Koch | 320/118 |
| 6,441,674 B1 * | 8/2002 | Lin | 327/512 |
| 6,928,381 B2 * | 8/2005 | Becker-Irvin et al. | 702/130 |
| 7,492,129 B2 * | 2/2009 | Aridome | 320/150 |
| 7,506,190 B2 * | 3/2009 | Thomas et al. | 713/322 |
| 2007/0188148 A1 * | 8/2007 | Kawasumi et al. | 320/134 |
| 2009/0087725 A1 * | 4/2009 | Sim | 429/90 |
| 2013/0038289 A1 * | 2/2013 | Tse | 320/118 |

FOREIGN PATENT DOCUMENTS

| | | |
|---|---|---|
| EP | 0361859 A2 | 4/1990 |
| JP | 08-138753 | 5/1996 |
| KR | 10-2006-0060830 A | 6/2006 |

OTHER PUBLICATIONS

Machine English Translation of JP 08-138753, Publication date of May 31, 1996.

* cited by examiner

*Primary Examiner* — Yalkew Fantu
(74) *Attorney, Agent, or Firm* — Christie, Parker & Hale, LLP

(57) ABSTRACT

A battery pack is disclosed that includes a plurality of battery cells and a plurality of temperature sensors. Each of the temperature sensors is for sensing a temperature of a corresponding one or more of the battery cells to generate a temperature signal, and the temperature sensors are divided into groups of temperature sensors. A plurality of A/D converters is provided, and each of the A/D converters is coupled to a corresponding one of the groups of temperature sensors to convert the temperature signal into a digital signal. An identification signal module is coupled to the A/D converters for applying different identification signals to the plurality of A/D converters, respectively. A controller is coupled to the A/D converters for receiving the identification signals and the temperature signal, and for identifying a temperature of each of the battery cells through the identification signals.

10 Claims, 2 Drawing Sheets

BATTERY PACK

CROSS-REFERENCE TO RELATED APPLICATION

This application claims priority to and the benefit of Korean Patent Application No. 10-2009-0113952 filed on Nov. 24, 2009, in the Korean Intellectual Property Office, and the entire content of which is incorporated herein by reference.

BACKGROUND

1. Field

Aspects of exemplary embodiments according to the present invention relate to a battery pack.

2. Description of Related Art

In general, a battery pack can be used in a number of devices such as a portable electronic device (e.g., a notebook, a Personal Digital Assistant (PDA), and a camcorder), an Uninterruptible Power Supply (UPS), etc. The battery pack is manufactured by integrating several battery cells into one unit, which are connected in parallel or series due to the capacity limitation of one battery cell.

A battery pack having a plurality of secondary battery cells connected in series has a capacity greater than the individual secondary battery cell and achieves a voltage corresponding to the number of secondary battery cells connected in series (cell serialization). Therefore, various capacities and voltage outputs may be obtained.

Additionally, when the battery pack is charged or discharged, a charger or a load is connected to an output terminal of the battery pack to concurrently (e.g., simultaneously) charge or discharge a plurality of battery cells connected in series. Accordingly, in order to improve reliability and stability of the battery pack, it is desirable to prevent or protect from over-charging or over-discharging of a battery cell.

SUMMARY

Aspects of embodiments of the present invention are directed toward a battery pack and controlling charge and discharge of the battery pack by measuring the temperature of a plurality of battery cells.

According to one embodiment of the present invention, a battery pack includes a plurality of battery cells, a plurality of temperature sensors, a plurality of A/D converters, an identification signal module, and a controller. Each of the plurality of temperature sensors is for sensing a temperature of a corresponding one or more of the battery cells to generate a temperature signal, and the temperature sensors are divided into groups of temperature sensors. Each of the plurality of A/D converters is coupled to a corresponding one of the groups of temperature sensors to convert the temperature signal into a digital signal. The identification signal module is coupled to the A/D converters for applying different identification signals to the plurality of A/D converters, respectively. The controller is coupled to the A/D converters for receiving the identification signals and the temperature signal, and for identifying a temperature of the battery cells through the identification signals.

The controller and the plurality of A/D converters may be coupled through a 1-Wire bus to perform communication therebetween.

The identification signals may include different voltages, different currents, or different original numbers.

The controller may be configured to control the identification signal module to apply the identification signals to the A/D converters, respectively.

The identification signal module may include a switching transistor having a control electrode coupled to the controller.

A first electrode of the switching transistor may be coupled to a voltage source, and a second electrode of the switching transistor may be coupled to a ground through a voltage dividing resistor.

The switching transistor may be configured to selectively apply a voltage divided by the voltage dividing resistor as one of the identification signals.

The identification signal module may be configured to apply respectively different divided voltages to each of the plurality of A/D converters through a plurality of voltage dividing resistors as the identification signals.

The controller may be configured to identify each of the A/D converters through a corresponding one of the identification signals and to identify the corresponding one of the groups of temperature sensors through a corresponding one of the A/D converters.

The battery pack may further include an analog front end for controlling turn-on and turn-off of a charge and discharge switch device according to a signal of the controller coupled in series to the battery cells.

BRIEF DESCRIPTION OF THE DRAWINGS

The above and other features and aspects of the present invention will become more apparent to those of ordinary skill in the art by describing in detail exemplary embodiments with reference to the attached drawings, in which.

DETAILED DESCRIPTION

Exemplary embodiments of the present invention will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the present invention to those skilled in the art.

Hereinafter, embodiments will be described in detail with reference to the accompanying drawings.

Figure 1:
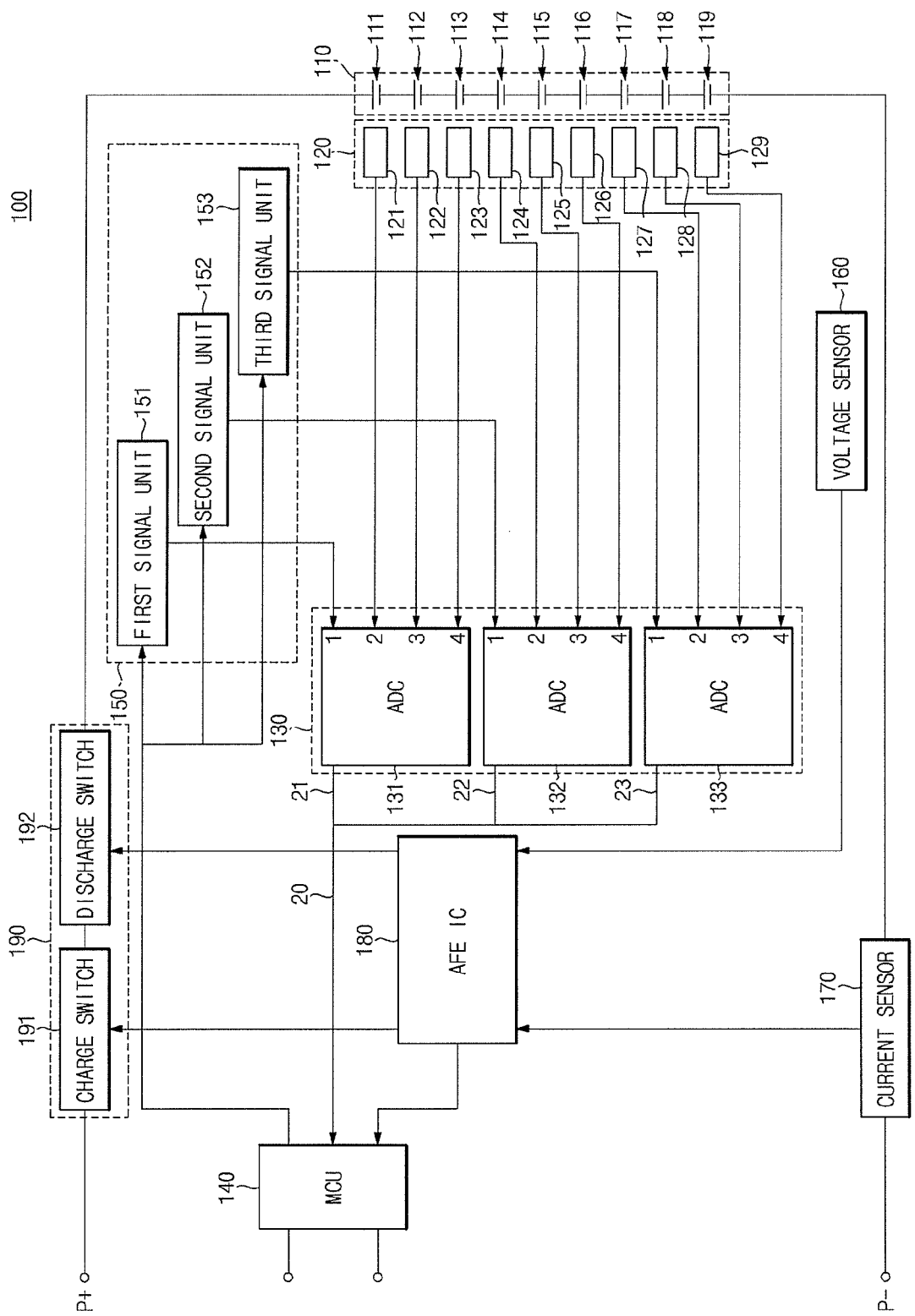
FIG. 1 is a block diagram illustrating a battery pack according to an embodiment of the present invention.
Figure 2:
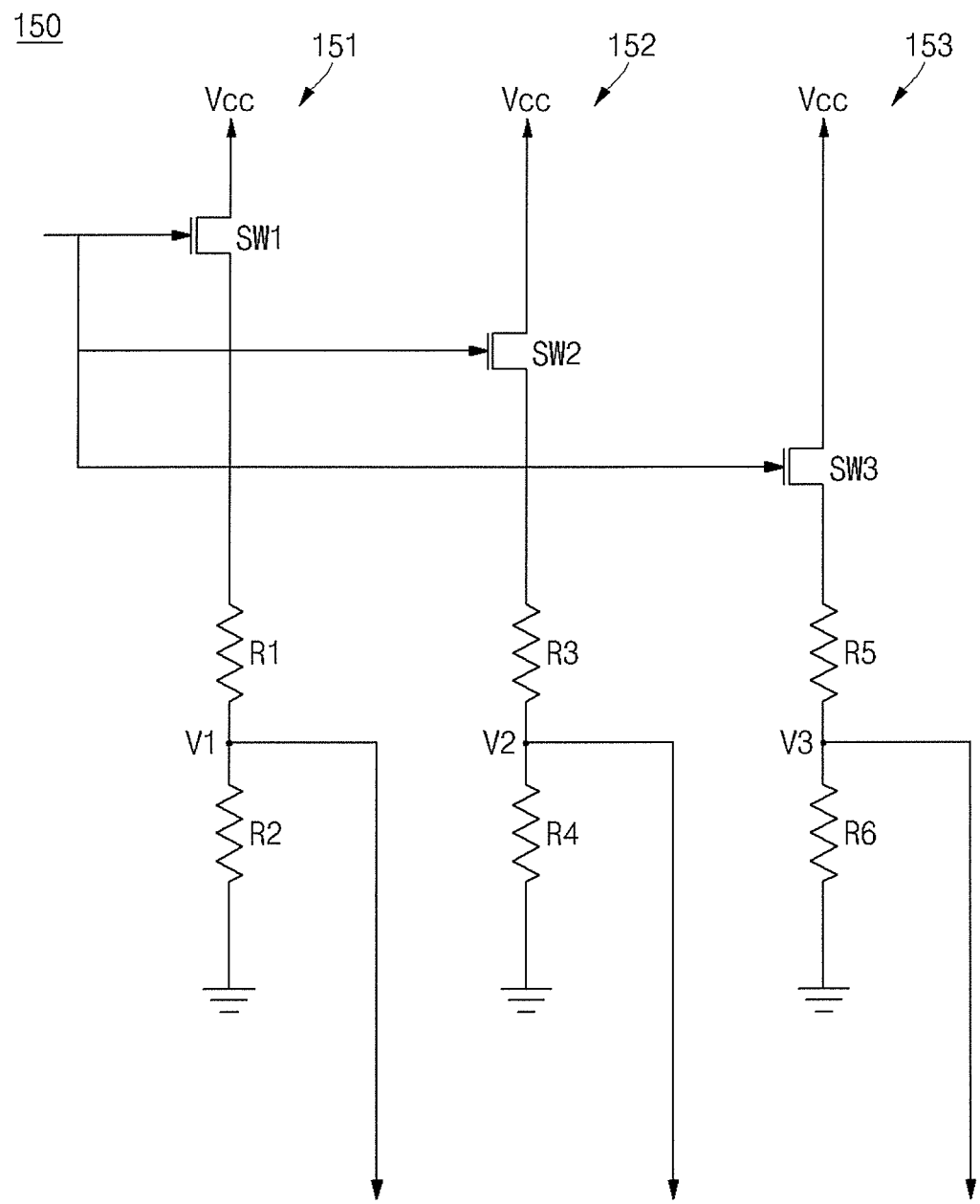
FIG. 2 is a circuit diagram illustrating one example of an identification signal module in the battery pack according to an embodiment of the present invention.

FIG. 1 is a block diagram illustrating a battery pack 100 according to an embodiment of the present invention. FIG. 2 is a circuit diagram illustrating one example of an identification signal module 150 in the battery pack 100 according to an embodiment of the present invention.

Referring to FIGS. 1 and 2, the battery pack 100 according to an embodiment of the present invention includes a plurality of battery cells 110, a plurality of temperature sensors 120 for measuring temperatures of the battery cells 110, an A/D converter (ADC) 130 connected to the temperature sensors 120, a controller 140 (e.g., MCU) connected to the A/D converter 130, and an identification signal module 150 connected to the controller 140. Additionally, the battery pack 100 further includes a voltage sensor 160 for measuring a voltage of one or more of the battery cells 110, a current sensor 170 for sensing a current of the battery cells 110, an analog front end (AFC) 180 connected to the controller 140, and a switching device 190 connected to the analog front end 180 to control a high current.

The battery cells 110 may have a configuration where a plurality of secondary batteries are connected in series and/or parallel. The battery cell 110 may be a cylinder type lithium ion battery, a prismatic type lithium ion battery, or a pouch type lithium ion battery, but the battery cells 110 are not limited to these examples. The battery cells 110 are connected to a high current line so as to perform charging and discharging. In addition, in one example, the battery cells 110 may include a first battery cell to a ninth battery cell (111, 112, 113, 114, 115, 116, 117, 118, 119), but the number of the battery cells 110 is not restricted as such.

The temperature sensors 120 include a plurality of temperature sensors to sense a temperature of each of the battery cells 110 and then generate a temperature signal. In one embodiment, the temperature sensors 120 may be attached on the surface of the battery cells 110. The temperature sensors 120 may include a thermal coupler TC device for measuring a temperature of the battery cells 110.

In one embodiment, the temperature sensors 120 have the same number of sensors as the battery cells 110 and may be positioned at each of the battery cells 110, or has less number of sensors than the battery cells 110 and may be positioned at one or more battery cells 110. In one embodiment, the temperature sensors 120 include a first temperature sensor to a ninth temperature sensor (121, 122, 123, 124, 125, 126, 127, 128, 129), which are connected to the battery cells 110, respectively, but the number of the temperature sensors 120 is not restricted as such.

The A/D converter 130 includes a plurality of A/D converters and is connected to the temperature sensors 120. The A/D converter 130 receives a temperature signal of the temperature sensors 120 and converts it into a digital signal. In one embodiment, the number of the A/D converters 130 is less than that of the temperature sensors 120. The temperature sensors 120 are divided into a plurality of groups, and each group is connected to a corresponding one of the A/D converters 130. Accordingly, the A/D converter 130 receives a temperature signal from each of the temperature sensors 120.

In one embodiment, the A/D converter 130 includes a first A/D converter to a third A/D converter (131, 132, 133). Additionally, in one embodiment, the first temperature sensor 121 to the third temperature sensor 123 may be connected to the first converter 131, the fourth temperature sensor 124 to the sixth temperature sensor 126 are connected to the second A/D converter 132, and the seventh temperature sensor 127 to the ninth temperature sensor 129 are connected to the third A/D converter 133, but the present invention is not limited as described above.

In addition, each of the first to third A/D converters 131 to 133 is connected to the identification signal module 150. Each of the first to third A/D converters 131 to 133 receives respectively different identification signals from the identification signal module 150. As a result, the first to third A/D converters 131 to 133 respectively convert the received identification signals into digital signals, and temperature signals transferred to the controller 140 are distinguished by the identification signals.

In addition, the A/D converter 130 may communicates with the controller 140 through a 1-Wire bus 20. Here, each of the first to third A/D converters 131 to 133 may sequentially communicate with the controller 140 through the 1-Wire bus 20. Each of the first to third A/D converters 131 to 133 sequentially applies an identification signal and a temperature signal to communicate with the controller 140. Accordingly, the controller 140 identifies the first to third A/D converters 131 to 133 through the identification signals, and then identifies a temperature signal, which is sequentially applied later, as a temperature signal of one of the temperature sensors 121 to 129 connected to a corresponding one of the first to third A/D converters 131 to 133.

The controller 140 is connected to the A/D converter 130. In one embodiment, the controller 140 is connected to the A/D converter 130 through the 1-Wire bus 20. Here, the 1-Wire bus 20 may be connected to each of the first to third A/D converters 131 to 133 through wires 21 to 23 diverged from the end part of the 1-Wire bus 20.

The controller 140 receives an identification signal and a temperature signal from each of the first to third A/D converters 131 to 133 through the 1-Wire bus 20, and identifies which one of the first to third A/D converters 131 to 133 communicates with the controller 140 through the identification signal. Additionally, after identifying one of the first to third A/D converters 131 to 133, the controller 140 identifies a sequentially applied temperature signal as a temperature signal of a corresponding one of the temperature sensors 121 to 129 connected to the identified one of the first to third A/D converters 131 to 133.

In one example, the controller 140 identifies that the first A/D converter 131 is connected to the controller 140 using an identification signal applied through the 1-Wire bus 20. The controller 140 identifies that a temperature signal, which is sequentially applied after the identification signal, is delivered from one of the first to third temperature sensors 121 to 123 connected to the first A/D converter 131. As a result, after the first A/D converter 131 is identified through the identification signal, the controller 140 identifies the sequential temperature signal as a signal that is generated by measuring a temperature of one of the first to third battery cells 111 to 113.

In addition, the above described operation is similarly applied to a case where the controller 140 identifies the second A/D converter 132 or the third A/D converter 133 through an identification signal. That is, if the second A/D converter 132 is identified, the temperature signal is identified as a signal of one of the fourth to sixth temperature sensors 124 to 126, and thus is identified as a temperature of one of the fourth to sixth battery cells 114 to 116. In addition, if the third A/D converter 133 is identified, the temperature signal is identified as a signal of one of the seventh to ninth temperature sensors 127 to 129, and thus is identified as a temperature of one of the seventh to ninth battery cells 117 to 119.

Accordingly, since the controller 140 is connected to the plurality of A/D converters 131 to 133 through the 1-Wire bus 20, it only needs to allocate a port for the 1-Wire bus 20 and the identification signal module 150. That is, the plurality of A/D converters 131 to 133 and the plurality of temperature sensors 121 to 129 connected thereto may be connected to the controller 140 through one port via the 1-Wire bus 20. Moreover, the controller 140 can identify each of the first to third A/D converters 131 to 133 and the temperature sensors 121 to 129 through an identification signal. Accordingly, when the number of battery cells 110 is increased, and thus the number of temperature sensors 120 is increased, the controller 140 does not need additional port. Therefore, expandability of the battery cell 110 and the temperature sensor 120 can be obtained without difficulties.

The identification signal module 150 is connected between the controller 140 and the A/D converter 130. The identification signal module 150 receives a control signal from the controller 140, and operates according thereto, such that it applies respectively different identification signals to the first to third A/D converters 131 to 133.

FIG. 2 is a circuit schematic illustrating one example of the identification signal module 150. Referring to FIGS. 1 and 2, the identification signal module 150 includes first to third signal units 151 to 153 to correspond to the first to third A/D converters 131 to 133, respectively.

The first signal unit 151 includes a first switching device SW1, a first resistor R1, and a second resistor R2. The first switching device SW1 has a control electrode connected to the controller 140 and a first electrode connected to a first voltage source Vcc. The first resistor R1 and the second resistor R2 connected between a second electrode of the first switching device SW1 and a second voltage source. In one embodiment, the first voltage source Vcc may be a voltage source applied from the controller 140, and the second voltage source may be ground. In one embodiment, the switching device SW1 may be a switching transistor.

When the controller 140 applies a turn-on control signal (e.g., a high-level signal) to the first signal unit 151, the first switching device SW1 is turned on. Then, a current path is formed between the first voltage source Vcc and the second voltage source with the first resistor R1 and the second resistor R2 connected in series therebetween. At this point, a divided voltage is formed across the second resistor R2 according to resistance values of the first resistor R1 and the second resistor R2. Moreover, an electric potential V1 at the connection between the first resistor R1 and the second resistor R2 is applied to the first A/D converter 131 as a first identification signal.

The second signal unit 152 operates similarly as the first signal unit 151. When the second switch SW2 is turned on, an electric potential V2 at the connection between the third resistor R3 and the fourth resistor R4 is applied to the second A/D converter 132 as a second identification signal according to resistance values of the third resistor R3 and the fourth resistor R4.

Additionally, the third signal unit 153 operates similarly as the first signal unit 151. When the third switch SW3 is turned on, an electric potential V3 at the connection between the fifth resistor R5 and the sixth resistor R6 is applied to the third A/D converter 133 as a third identification signal according to resistance values of the fifth resistor R5 and the sixth resistor R6.

At this point, identification signals of the first signal unit 151 to the third signal unit 153 may have different values according to resistance values of the first resistor R1 to the sixth resistor R6.

In one embodiment, when the first voltage source Vcc is a constant voltage source of 5 V, a resistance value of the first resistor R1 is 20Ω, and a resistance value of the second resistor R2 is 30Ω, and the first identification signal V1 becomes 3 V.

In addition, when a resistance value of the third resistor R3 is 30Ω and a resistance value of the fourth resistor R4 is 20Ω, the second identification signal V2 becomes 2 V.

In addition, when a resistance value of the fifth resistor R5 is 40Ω and a resistance value of the sixth resistor R6 is 10Ω, the third identification signal V3 becomes 1 V. That is, the identification signals V1 to V3 may be differently applied to the first A/D converter 131, the second A/D converter 132, and the third A/D converter 133 as 3 V, 2 V, and 1 V, respectively, and the controller 140 can identify the first A/D converter 131 to the third A/D converter 133 through the identification signals V1 to V3.

In this case, if the identification signal applied to the controller 140 is 3 V, the controller 140 identifies it as the first identification signal V1 indicating that the first A/D converter 131 is in communication. Additionally, the next applied signal is identified as a temperature signal that is measured in the first temperature sensor 121 to the third temperature sensor 123.

In this case, if the identification signal applied to the controller 140 is 2 V, the controller 140 identifies it as the second identification signal V2 indicating that the second A/D converter 132 is in communication. Additionally, the next applied signal is identified as a temperature signal that is measured in the fourth temperature sensor 124 to the sixth temperature sensor 126.

In this case, if the identification signal applied to the controller 140 is 1 V, the controller 140 identifies it as the third identification signal V3 indicating that the third A/D converter 133 is in communication. Additionally, the next applied signal is identified as a temperature signal that is measured in the seventh temperature sensor 127 to the ninth temperature sensor 129.

In addition, although it is described that the identification signals V1 to V3 are voltages, it is not limited thereto, that is, it may be a current or an original number form.

The voltage sensor 160 is connected to the battery cells 110. The voltage sensor 160 may be connected in parallel to the battery cells 110 to measure a cell voltage, or may be connected in parallel to a pack including the connected battery cells 110 to measure a pack voltage. Moreover, the voltage sensor 160 generates a voltage signal corresponding to the cell voltage or pack voltage. The voltage sensor 160 is connected to the analog front end 180 to apply the voltage signal.

The current sensor 170 is connected to the battery cells 110. The current sensor 170 may be connected in series to an entire pack including the battery cells 110. That is, the current sensor 170 is connected to a high current line that is connected to the entire pack to measure a current passing through the high current line and to generate a current signal corresponding thereto. Additionally, the current sensor 170 is connected to the analog front end 180 to apply the current signal.

The analog front end 180 is connected to the controller 140, the voltage sensor 160, and the current sensor 170. The analog front end 180 applies a voltage signal of the voltage sensor 160 and a current signal of the current sensor 170 to the controller 140.

Additionally, the analog front end 180 receives a signal from the controller 140. The controller 140 applies a control signal to the analog front end 180 when a temperature signal applied from the A/D converter 130 indicates a temperature that exceeds a set or predetermined temperature, or a voltage signal applied from the analog front end 180 indicates a voltage that exceeds a set or predetermined voltage, or a current signal indicates a current exceeds a set or predetermined current. Additionally, the analog front end 180 controls the switching device 190 and switches the high current line according to a control signal of the controller 140. As a result, the analog front end 180 controls charging and/or discharging of the battery cells 110 according to a control signal of the controller 140.

The switching device 190 is connected in series to the battery cells 110. The switching device 190 is connected in series to the high current line. The switching device 190 includes a charge switch 191 for controlling a charge path of the battery cells 110 and a discharge switch 192 for controlling a discharge path of the battery cells 110. Additionally, the charge switch 191 and/or the discharge switch 192 are/is turned on or off by the analog front end 180 to open/close the high current line. Therefore, over charge and/or over discharge of the battery cell 110 can be controlled.

As mentioned above, the battery pack 100 according to an embodiment of the present invention applies a temperature signal by connecting the A/D converter 130, which is connected to the plurality of temperature sensors 120, with the controller 140 through the 1-Wire bus 20. Different identification signals of the identification signal module 150 are applied to the controller 140 through the first to third A/D converters 131 to 133, respectively. Accordingly, in the battery pack 100 according to an embodiment of the present invention, the controller 140 can identify the first to third A/D converters 131 to 133 and the temperature sensors 121 to 129 through the identification signals without difficulties, and even when the number of temperature sensors 120 is increased, it is not necessary to add a port to the controller 140. Therefore, its expandability can be improved.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims and their equivalents.

What is claimed is:

1. A battery pack comprising:
a plurality of battery cells;
a plurality of temperature sensors, each of the temperature sensors being for sensing a temperature of a corresponding one or more of the battery cells to generate a temperature signal, the temperature sensors being divided into groups of temperature sensors;
a plurality of A/D converters, each of the A/D converters coupled to a corresponding one of the groups of temperature sensors to convert the temperature signal into a digital signal;
an identification signal module coupled to the A/D converters for applying different identification signals to the plurality of A/D converters, respectively; and
a controller coupled to the A/D converters for receiving the identification signals and the temperature signal, and for identifying a temperature of the battery cells through the identification signals.

2. The battery pack as claimed in claim 1, wherein the controller and the plurality of A/D converters are coupled through a 1-Wire bus to perform communication therebetween.

3. The battery pack as claimed in claim 1, wherein the identification signals comprise different voltages, different currents, or different original numbers.

4. The battery pack as claimed in claim 1, wherein the controller is configured to control the identification signal module to apply the identification signals to the A/D converters, respectively.

5. The battery pack as claimed in claim 1, wherein the identification signal module comprises a switching transistor having a control electrode coupled to the controller.

6. The battery pack as claimed in claim 5, wherein a first electrode of the switching transistor is coupled to a voltage source, and a second electrode of the switching transistor is connected to a ground through a voltage dividing resistor.

7. The battery pack as claimed in claim 6, wherein the switching transistor is configured to selectively apply a voltage divided by the voltage dividing resistor as one of the identification signals.

8. The battery pack as claimed in claim 6, wherein the identification signal module is configured to apply respectively different divided voltages to each of the plurality of A/D converters through a plurality of voltage dividing resistors as the identification signals.

9. The battery pack as claimed in claim 1, wherein the controller is configured to identify each of the A/D converters through a corresponding one of the identification signals and to identify the corresponding one of the groups of temperature sensors through a corresponding one of the A/D converters.

10. The battery pack as claimed in claim 1, further comprising an analog front end for controlling turn-on and turn-off of a charge and discharge switch device according to a signal of the controller coupled in series to the battery cells.

* * * * *